United States Patent [19]

Watanabe et al.

[11] Patent Number: 4,605,571

[45] Date of Patent: Aug. 12, 1986

[54] PROCESS FOR IMPROVING ABRASION RESISTANCE OF TEXTILE BELTS

[75] Inventors: Akio Watanabe, Kyoto; Sumio Goto, Moriyama, both of Japan

[73] Assignee: Dai-Ichi Kogyo Seiyaku Co., Ltd., Kyoto, Japan

[21] Appl. No.: 701,524

[22] Filed: Feb. 14, 1985

[30] Foreign Application Priority Data

Feb. 17, 1984 [JP] Japan .................................. 59-29085

[51] Int. Cl.$^4$ .............................................. B05D 3/02
[52] U.S. Cl. .................................... 427/387; 427/389; 427/389.8; 427/389.9; 427/392
[58] Field of Search .................... 427/389, 389.9, 392, 427/389.8, 387; 474/268, 434.6

[56] References Cited

U.S. PATENT DOCUMENTS

| | | | |
|---|---|---|---|
| 3,505,105 | 4/1970 | Macfariane et al. | 427/389.9 |
| 3,904,796 | 9/1975 | Zorn et al. | 427/389.9 |
| 4,421,826 | 12/1983 | Ohlson et al. | 427/389.9 X |
| 4,464,431 | 7/1984 | Hisaki et al. | 427/389.9 |

*Primary Examiner*—Thurman K. Page
*Attorney, Agent, or Firm*—Antonelli, Terry & Wands

[57] ABSTRACT

A process for improving the abrasion resistance of textile belts without decreasing the flexibility and with a good workability, which comprises applying an aqueous composition comprising a water soluble or dispersible, thermally reactive blocked urethane prepolymer to textile belts, and then subjecting the textile belts to heat treatment, thereby converting the blocked urethane prepolymer into a high molecular weight urethane resin.

9 Claims, No Drawings

PROCESS FOR IMPROVING ABRASION RESISTANCE OF TEXTILE BELTS

BACKGROUND OF THE INVENTION

The present invention relates to a process of processing textile belts for improving the abrasion resistance thereof.

Hitherto, improvement in the abrasion resistance of textile belts has been made generally by immersing the textile belts in an emulsion of a resin such as polyacrylic acid esters, polyvinyl acetate or polyurethane, or a methylolmelamine resin. However, such a method has problems in the abrasion resistance, workability, hand touchness and so on of the treated textile belts, as mentioned below. When a textile belt is treated with the resin emulsion, the permeation of the resin into the textile belt is insufficient and accordingly most of the resin applied tends to remain in the surface region of the belt, thus resulting in a decrease of the flexibility that the belt essentially has. When such a textile belt whose flexibility is impaired, is drawn, the tensile force is not distributed to individual belt-constituting filaments, and consequentially, the breaking strength of the belt is decreased. Furthermore, such a textile belt cannot be retain its original shape and undergoes wavy deformation after a certain number of abrasions, so that it is expected that a much more marked decrease in abrasion resistance will result. On the other hand, use of a methylolmelamine resin has the disadvantage that the belt becomes hard in touchness. Also, the above-mentioned surface-adhering resin or such a hard resin as a methylolmelamine resin is frequently accompanied by occurrence of chalk marks.

From the workability viewpoint, there is the risk of gum-up during the step of subjecting the emulsion resin-impregnated textile belt to squeezing by rolls. There is also a tendency of a large amount of gum-like resin adhering to guide rollers within a drying box and rendering prolonged continuous processing difficult. In such a case, the resin gummed up by the squeeze rolls and the resin sticking to the guide rollers will subsequently cause fuzzing, and consequently, the abrasion resistance is markedly decreased.

It is an object of the present invention to eliminate the above-mentioned drawbacks of a conventional process for improving the abrasion resistance of textile belts.

A further object of the present invention is to provide a process for improving the abrasion resistance of textile belts which is applicable to any textile belts regardless of their textile materials.

These and other objects of the present invention will become apparent from the description hereinafter.

SUMMARY OF THE INVENTION

It has now been found that the above-mentioned objects can be attained by using an aqueous composition containing as a main component a water-soluble or water-dispersible and heat-reactive blocked urethane prepolymer in treating textile belts.

In accordance with the present invention, there is provided a process for improving the abrasion resistance of a textile belts which comprises treating a textile belt with a water-soluble or water-dispersible and heat-reactive blocked urethane prepolymer, and subjecting the treated textile belt to heat treatment.

The process of the present invention provides an excellent abrasion resistance to textile belts as compared with a conventional process. The reason is not clear, but it is presumed that the thermally reactive urethane resin used in the present invention is water-soluble or water-dispersible, thus highly penetrating, and relatively low in molecular weight as compared with common emulsion-type resins and, in itself, has a polymeric surfactant-like structure, and accordingly when a textile belt is immersed in a composition containing the resin, the composition permeates into the textile with ease and in a short period of time and the surfaces of the belt-constituting individual filaments are uniformly coated.

According to the process of the invention, the resin does not stick to the belt surface in large amounts and, therefore, the belt can retain its flexibility as it is originating from the textile structure thereof. Also, the resin used in the present invention has thermal reactivity, and accordingly, the resin is converted into a high molecular urethane resin having a three-dimensional network structure by heat treatment of the textile belt impregnated with the resin. It is considered that the resin polymerizes on the fiber surfaces, whereby the adhesion to the fibers is increased. From the workability viewpoint, the process of the invention is also advantageous in that the squeeze rolls will not cause the gum-up phenomenon and the adhesion of the resin to the guide rollers within a drying box is very little, thus a long-term continuous processing is possible. For the reasons as mentioned above, the process of the present invention provides a flexible textile belt having an excellent abrasion resistance and a good impact resilience.

DETAILED DESCRIPTION

The textile materials constituting the textile belts to be used in the practice of the invention may be any materials, regardless of woven or knitted goods, made of various fiber materials, e.g. a synthetic fiber such as polyester, polyamide, polyacrylonitrile, polyolefin or polyurethane, a semisynthetic fiber such as rayon or acetate, a natural fiber such as cotton, silk, wool, flax or hemp, and an inorganic fiber such as carbon or glass, or a blended yarn, combined filament yarn or union cloth of these fibers. Accordingly, the process of the present invention is applicable to all types of textile belts. The use of a filament-constructed textile belt is preferred, since more marked effects can be obtained.

The term "water-soluble or water-dispersible and heat-reactive blocked urethane prepolymer" as used herein generally means a compound which is derived from a urethane prepolymer by blocking the free isocyanate group thereof with a chemical agent generally known as a blocking agent for the isocyanate group, such as a secondary or tertiary alcohol, an active methylene-containing compound, a phenol compound, a halogenated phenol compound, an oxime, a lactam, an imidazole or a bisulfite, and which is also provided with a water solubility or dispersibility.

Such a blocked urethane prepolymer usable in the present invention includes a compound of the type derived from a free isocyanate group-containing urethane prepolymer by blocking a part of the isocyanate group with a blocking agent incapable of imparting a water solubility or dispersibility to the prepolymer and addition-reacting the residual isocyanate group with a thermally undissociable, water-soluble group-containing compound, or a compound of the type derived from a free isocyanate group-containing urethane prepolymer by partly or wholly blocking the isocyanate group with a bisulfite and blocking the remaining isocyanate group with a blocking agent incapable of giving a water solubility or dispersibility.

For providing the urethane prepolymer with water solubility or dispersibility, any generally known methods may be used. For instance, the water-solubility or dispersibility can be imparted to the urethane prepolymer by introducing sodium salt of taurine, sodium salt of glycine, an alkyl halide, diethyl sulfate, dimethyl sulfate or polyethylene glycol into the prepolymer. The thus modified prepolymer to render soluble or dispersible in water may be anionic, cationic or non-ionic.

Preferably, the free isocyanate group-containing urethane prepolymer used for the preparation of such a blocked urethane prepolymer is a urethane prepolymer having a free isocyanate group content of 0.1 to 10% by weight obtained by reacting a compound having at least two hydroxyl groups and a molecular weight of 800 to 8,000 with an excess amount of an organic polyisocyanate and, if necessary, further with a chain extender.

Among the compounds having at least two hydroxyl groups, particularly preferred are those having a polyether, polyester or polyetherester fundamental skeleton. The polyether includes, for instance, polymerization products of an alkylene oxide such as ethylene oxide or butylene oxide, styrene oxide or epichlorohydrin, and addition polymerization products of these compounds onto a polyhydric alcohol or phenol. The polyester and polyetherester include, for instance, linear or branched condensation products obtained by a reaction of a polyvalent saturated or unsaturated carboxylic acid, and an acid anhydride thereof, etc., and a saturated or unsaturated polyhydric alcohol, a relatively low molecular weight polyalkylene glycol, or a mixture of these compounds. Polyesters derived from a lactone and a hydroxy acid, and polyether esters obtained by addition of an alkylene oxide to a polyester prepared in advance are also usable. Further, compounds of special type whose constituent unit is an organosiloxane and which contain at least two hydroxyl groups at the ends or in the side chains of their molecules can also be used in the present invention.

Since the process of the present invention is to be applied to textile belts, attention should be given not to cause yellowing of the textile belts. From this point of view, preferred examples of the above-mentioned organic polyisocyanate are aromatic-aliphatic isocyanates such as xylene diisocyanate, alicyclic isocyanates such as isophorone diisocyanate, and aliphatic isocyanates such as hexamethylene diisocyanate. In case where yellowing of the textile belts does not matter in practical use, aromatic isocyanates such as tolylene diisocyanate and diphenylmethane diisocyanate may also be used.

Examples of the chain extender are, for instance, glycols, polyhydric alcohols, amino alcohols, diglycols, amino or mercapto group-containing compounds and water.

The urethane prepolymers can be produced by known methods. Also, the blocking of the free isocyanate group of the urethane prepolymer can be conducted in known manners.

The blocked urethane prepolymer used in the present invention is in the form of an aqueous composition, namely an aqueous solution or aqueous emulsion in water alone or a mixed solvent of water and a water-miscible organic solvent such as a lower alcohol or dioxane. The blocked urethane prepolymer composition prepared in the above manner may, depending on the kind of urethane prepolymer used, change from the water-in-oil emulsion into the oil-in-water emulsion after initiation of the blocking reaction, or remain in the oleaginous emulsion form during the blocking reaction but undergoes phase conversion into the oil-in-water emulsion in the subsequent step of dilution with water. In any case, however, the final product obtained by blocking of a urethane prepolymer is a stable composition containing a thermally reactive urethane prepolymer whose free isocyanate group is blocked. This thermally reactive urethane resin composition can be stored for a long term and, when heat-treated at a temperature of 100° to 180° C., releases the blocking agent, whereby the isocyanate group is regenerated and reacts to form a high molecular weight urethane resin. Accordingly, the thermally reactive urethane resin composition of the present invention is superior in durability, strength and elongation and nonstickiness to conventional aqueous urethane resin compositions.

The thermally reactive urethane resin composition of the present invention may contain additives such as an antioxidant or a lubricant, as occasion demands.

The processing of a textile belt is carried out by applying the thermally reactive urethane resin composition to the textile belt and then heat-treating the belt, usually at a temperature of 100° to 180° C. for 10 seconds to 20 minutes, whereby the urethane prepolymer is polymerized on the surfaces of the fibers to improve the abrasion resistance of the belt. In general, dipping is preferred as a manner of applying the thermally reactive urethane resin composition to a textile belt, but spraying, coating, e.g. kissing roller coating, and others may also be adopted. The thermally reactive urethane resin composition is applied to the belt usually in an amount of 0.1 to 20% o.w.f. However, this range may vary depending on the purposes of textile belts to be processed.

The present invention is more specifically described and explained by means of the following Examples, in which all parts and % are by weight unless otherwise noted. It is to be understood that the present invention is not limited to the Examples, and various changes and modifications may be made in the invention without departing from the spirit and scope thereof.

Also, the following Reference Examples are presented to illustrate the preparation of the thermally reactive urethane resin composition used in the process of the present invention.

REFERENCE EXAMPLE 1

A 2 liter three-necked flask equipped with an internal thermometer, a stirrer and a dropping funnel was charged with 200 parts of a polyether polyol having a molecular weight of 3,000, namely a glycerol-based ethylene oxide-propylene oxide polyaddition product (ethylene oxide:propylene oxide=50:50). To the flask was added 37.6 parts of xylene diisocyanate from the dropping funnel at room temperature. The temperature of the system was raised to 110° C. and the reaction was conducted for 70 minutes to give urethane prepolymer having a free isocyanate group content of 3.70%.

The temperature was then dropped to 50° C., and a solution of 3.0 parts of 2,5-di-tert-butylhydroquinone as an antioxidant in 150 parts of ethanol was added to the reaction mixture. Then, 90 parts of a 20% aqueous solution of sodium bisulfite was added and, after conducting the reaction for about 30 minutes, the reaction mixture was diluted with water to give a transparent and viscous, thermally reactive, water-soluble urethane resin composition having a resin content of 20%.

REFERENCE EXAMPLE 2

The same reaction vessel as used in Reference Example 1 was charged with 200 parts of a polyester diol having a hydroxyl value of 90 obtained from adipic acid, neopentyl glycol and 1,6-hexanediol, 50 parts of polyoxyethylene glycol having a molecular weight of 1,000 and 10 parts of trimethylolpropane, followed by addition of 93 parts of hexamethylene diisocyanate at room temperature. The temperature was then raised to 90° C. and the reaction was conducted at that temperature for 60 minutes to give a urethane prepolymer having a free isocyanate content of 5.30%.

To the reaction mixture were added 47 parts of ethyl acetoacetate, 100 parts of dioxane and 1.0 part of sodium methylate, and the reaction was conducted at 80° C. for 2 hours to give a partially blocked urethane prepolymer having a free isoycanate content of 1.1%. The temperature was then dropped to 40° C., and 31 parts of a 30% aqueous solution of sodium glycinate was added and the reaction was conducted for 40 minutes at that temperature. The obtained reaction mixture was diluted with water to give a transparent and highly viscous composition having a resin content of 40%.

REFERENCE EXAMPLE 3

The same reaction vessel as used in Reference Example 1 was charged with 353 parts of the urethane prepolymer (free isocyanate content: 5.3%) prepared in the same manner as in Reference Example 2, 47 parts of ethyl acetoacetate, 100 parts of dioxane and 1.0 part of sodium methylate, followed by addition of 7.48 parts of dimethylethanolamine.

The reaction was conducted at 80° C. for 2 hours, whereby the free isocyanate content was decreased to 0.15%. Then, after adding of 20 parts of ethylene glycol monoethyl ether to the reaction mixture, the reaction was continued at 80° C. for 1 hour, whereby the free isocyanate content became 0%. After lowering the temperature of the system to 50° C., 13 parts of diethyl sulfate was added gradually and the reaction was conducted at 80° C. for 2 hours to convert the blocked urethane prepolymer into a quaternary salt (conversion: 90%). The reaction mixture was diluted with water to a resin content of 40%, and the resulting composition was adjusted to pH 5 with a small amount of phosphoric acid. The thus obtained composition was a viscous liquid giving a feeling of transparency.

REFERENCE EXAMPLE 4

To 200 parts of a modified silicone oil having a hydroxyl value of 73.11 (commercially available under the trade mark "Toray Modified Silicone Oil SH-3771" made by Toray Silicone Kabushiki Kaisha) was added 49.00 parts of xylylene diisocyanate at room temperature. The temperature of the system was raised to 95° C., and the reaction was carried out for 70 minutes to give a urethane prepolymer having a free isocyanate content of 4.38%.

To 200 parts of the urethane prepolymer was added 72.3 parts of a 30% aqueous solution of sodium bisulfite at 40° C., and the resulting mixture was stirred at that temperature for 70 minutes. The reaction mixture was then diluted with water to give a transparent and viscous, thermally reactive, water-soluble urethane resin composition having a resin content of 30%.

EXAMPLE 1 AND COMPARATIVE EXAMPLE 1

To 100 parts of the thermally reactive urethane resin composition obtained in Reference Example 1, 2 or 3 were added 5 parts of an emulsion of an organotin compound catalyst (commercially available under the trade mark "Elastron Catalyst 32" made by DAI-ICHI KOGYO SEIYAKU CO., LTD.) and, further, 5 parts of a silicone emulsion (solid content: 15%) as a lubricant. Water was added to the mixture to adjust the resin content to 2% (Experiments 1, 2 and 3).

In a further experiment, 5 parts of Elastron Catalyst 32 was added to 100 parts of the thermally reactive urethane resin composition of Reference Example 4, followed by adjustment of the resin content to 2% with water (Experiment 4).

Further, 70 parts of the thermally reactive urethane resin composition of Reference Example 1 was mixed with 30 parts of the thermally reactive urethane resin composition of Reference Example 4, and thereto was added 5 parts of Elastron Catalyst 32, followed by adjustment of the resin content to 2% with water (Experiment 5).

For comparison, 5 parts of the same silicone emulsion (lubricant) as above was added to 100 parts of a polyacrylate emulsion (solid content: 40%), and the resin content was adjusted with water to 2% (Comparative Example 1).

A polyester filament webbing (black-dyed) used for automobile seat belt was dipped in each of the resin compositions prepared above to thereby provide the webbing with 0.4% o.w.f. of the resin. The dipped webbing was predried at 110° C. for 3 minutes and heat-treated at 160° C. for 3 minutes.

The thus obtained webbings for seat belt use were tested according to the abrasion resistance testing method provided in Japanese Industrial Standard (JIS) D 4604.

The results are shown in Table 1 with the results for the nontreated webbing as Control.

TABLE 1

|  | Tensile strength after processing (kg) | After 2,500 abrading strokes | | After 5,000 abrading strokes | |
| --- | --- | --- | --- | --- | --- |
|  |  | Tensile strength (kg) | Strength retention (%) | Tensile strength (kg) | Strength retention (%) |
| Control | 2,980 | 2,010 | 67.4 | 1,650 | 55.4 |
| Experiment 1 | 3,020 | 2,820 | 93.4 | 2,490 | 82.5 |
| Experiment 2 | 2,970 | 2,780 | 93.6 | 2,410 | 81.1 |
| Experiment 3 | 2,970 | 2,790 | 93.9 | 2,400 | 80.8 |
| Experiment 4 | 2,950 | 2,805 | 95.1 | 2,508 | 85.0 |
| Experiment 5 | 2,980 | 2,807 | 94.2 | 2,473 | 83.0 |
| Com. Ex. 2 | 2,800 | 2,250 | 80.4 | 1,880 | 67.1 |

As is evident from Table 1, the webbings of Experiments 1 to 5 treated in accordance with the present invention were superior in abrasion resistance, and they retained their strength even after 5,000 abrading strokes. Also, fuzzing and deformation of the seat belt webbings were not observed. In particular, those treated in Experiments 4 and 5 with the thermally reactive urethane resin containing the organosiloxane skeleton exhibited rather better strength retention percentages as compared with Experiments 1 to 3, presumably because of the smoothness of the resin film itself as retained even after abrasion testing. To the contrary, the non-treated webbing (Control) and the webbing of Comparative Example 1 were insufficient in abrasion resistance. Moreover, these seal belt webbings showed remarkable fuzzing as well as wavy deformation already after 2,500 abrading strokes. In double side abrasion testing using a stopper of adjuster, these differences were more remarkable and the webbings for comparison had little utility value.

EXAMPLE 2 AND COMPARATIVE EXAMPLE 2

To 100 parts of the thermally reactive urethane resin composition obtained in Reference Example 1, 2 or 3 were added 5 parts of Elastron Catalyst 32 and 5 parts of a silicone emulsion (solid content: 15%) as a lubricant, and the resin content was adjusted to 1% with water (Experiments 1, 2 and 3).

In another experiment, 5 parts of Elastron Catalyst 32 was added to 100 parts of the thermally reactive urethane resin composition obtained in Reference Example 4, and the resin content was adjusted to 1% with water (Experiment 4).

Further, 70 parts of the thermally reactive urethane resin composition obtained in Reference Example 1 was mixed with 30 parts of the thermally reactive urethane resin composition obtained in Reference Example 4, and to the resulting mixture was added 5 parts of Elastron Catalyst 32 followed by adjustment of the resin content to 1% with water (Experiment 5).

In Comparative Example 2, 5 parts of the silicone emulsion as a lubricant was added to 100 parts of a polyurethane resin emulsion (solid content: 40%), and the resin content was adjusted to 1% with water.

A Nylon filament webbing for seat belt use (black-dyed) was dipped in each of the resin compositions prepared above to thereby provide the webbing with 0.2% o.w.f. of the resin. The dipped webbings were predried at 110° C. for 3 minutes and then heat-treated at 150° C. for 3 minutes.

The thus obtained webbings for seat belt use were tested according to JIS D 4604.

The results are shown in Table 2 with the results for the nontreated webbings (Control).

TABLE 2

|  | Tensile strength after processing (kg) | After 2,500 abrading strokes | | After 5,000 abrading strokes | |
| --- | --- | --- | --- | --- | --- |
|  |  | Tensile strength (kg) | Strength retention (%) | Tensile strength (kg) | Strength retention (%) |
| Control | 2,970 | 2,430 | 81.8 | 1,970 | 66.3 |
| Experiment 1 | 2,980 | 2,860 | 96.0 | 2,630 | 88.3 |
| Experiment 2 | 2,970 | 2,860 | 96.3 | 2,610 | 87.9 |
| Experiment 3 | 2,960 | 2,840 | 95.9 | 2,620 | 88.5 |
| Experiment 4 | 2,940 | 2,846 | 96.8 | 2,617 | 89.0 |
| Experiment 5 | 2,970 | 2,866 | 96.5 | 2,634 | 88.7 |
| Com. Ex. 2 | 2,950 | 2,580 | 87.5 | 2,100 | 71.2 |

As evident from Table 2, the compositions according to the present invention imparted an excellent abrasion resistance to the Nylon webbing, too, and moreover, showed no fuzzing and deformation. To the contrary, the nontreated webbing (Control) and the webbing of Comparative Example 2 showed fuzzing and wavy deformation.

EXAMPLE 3 AND COMPARATIVE EXAMPLES 3 AND 4

To 100 parts of the thermally reactive urethane resin composition obtained in Reference Example 1, 2 or 3 were added 5 parts of Elastron Catalyst 32 and 5 parts of a polyethylene wax emulsion (solid content: 20%) as a lubricant, and the urethane resin content was adjusted to 3% with water (Experiments 1, 2 and 3).

In the same manner as above, 5 parts of the polyethylene wax emulsion as a lubricant was added to 100 parts of each of a polyvinyl acetate emulsion (solid content: 50%) (Comparative Exampe 3) and the same polyurethane resin emulsion as used in Comparative Example 2 (Comparative Example 4). Each of the obtained compositions was diluted with water to adjust the resin content to 3%.

A sling Nylon filament belt (black-dyed) for transporting containers was dipped in each of the thus prepared compositions to provide the belt with 0.6% o.w.f. of the resin, and then predried at 110° C. for 3 minutes and heat-treated at 150° C. for 3 minutes.

The thus treated sling belts for container were evaluated for several characteristics.

The results are shown in Table 3 together with the results for the nontreated belt (Control).

TABLE 3

|  | Elongation (%) | | Tensile strength (at break) | | Abrasion resistance[2] | |
| --- | --- | --- | --- | --- | --- | --- |
|  | 1 ton load | At break | kg | %[1] | kg | %[3] |
| Control | 27 | 42 | 3,600 | 100 | 3,050 | 84.7 |
| Experiment 1 | 20 | 27 | 3,620 | 100.6 | 3,570 | 98.6 |
| Experiment 2 | 18 | 26 | 3,650 | 101.4 | 3,430 | 94.0 |
| Experiment 3 | 18 | 25 | 3,680 | 102.2 | 3,490 | 94.8 |
| Com. Ex. 3 | 23 | 33 | 3,580 | 99.4 | 3,190 | 89.1 |
| Com. Ex. 4 | 18 | 25 | 3,640 | 101.1 | 2,780 | 78.3 |

(Notes)
[1]The relative value of the tensile strength to Control regarded as 100%.
[2]The abrasion resistance is shown in terms of the tensile strength measured after 2,500 abrasion strokes according to JIS D 4604.
[3]Percentage of tensile strength after abrasion to initial tensile strength.

As clearly seen in Table 3, the heat-reactive urethane resin compositions according to the present invention imparted an excellent abrasion resistance to the sling belt for containers, too, and showed no fuzzing and deformation. To the contrary, the nontreated belt (Control) and the belts of Comparative Examples 3 and 4 were insufficient in abrasion resistance and revealed fuzzing on the belt surface and wavy deformation.

In addition to the ingredients used in the Examples, other ingredients can be used in the Examples as set forth in the specification to obtain substantially the same results.

What we claim is:

1. A process for improving the abrasion resistance of a textile belt which comprises treating a textile belt with an aqueous composition consisting essentially of a water-soluble or water-dispersible and heat-reactive blocked urethane prepolymer having an organosiloxane structure, and subjecting the treated textile belt to a heat treatment.

2. The process of claim 1, wherein said blocked urethane prepolymer is derived from a urethane prepolymer having a free isocyanate group content of 0.1 to 10% by weight.

3. The process of claim 1, wherein the amount of said blocked urethane prepolymer is from 0.1 to 20% o.w.f.

4. The process of claim 1, wherein said heat treatment is carried out at a temperature of 100° to 180° C.

5. The process of claim 1, wherein said blocked urethane prepolymer is a compound which is derived from a urethane prepolymer by blocking the free isocyanate group thereof with a blocking agent selected from the group consisting of a secondary or tertiary alcohol, an active methylene-containing compound, a phenol compound, a halogenated phenol compound, an oxime, a lactam, an imidazole and a bisulfite and which is provided with a water solubility or dispersibility.

6. The process of claim 1, wherein said blocked urethane prepolymer is a compound derived from a urethane prepolymer by blocking a part of the free isocyanate group thereof with a blocking agent incapable of imparting a water solubility or dispersibility and reacting the residual isocyanate group with a thermally undissociable compound having a group capable of rendering the urethane prepolymer soluble or dispersible in water.

7. The process of claim 1, wherein said blocked urethane prepolymer is a compound derived from a urethane prepolymer by partly or wholly blocking the free isocyanate group thereof with a bisulfite and blocking the residual isocyanate group with a blocking agent incapable of giving a water solubility or dispersibility.

8. The process of claim 2, wherein said urethane prepolymer is a reaction product of a polyhydroxyl compound having said organosiloxane structure and at least 2 hydroxyl groups at the chain ends or in the side chains and an excess amount of an organic polyisocyanate.

9. The process of claim 1, wherein the fiber material of said textile belt is a member selected from the group consisting of polyester, polyamide, polyacrylonitrile, polyolefin, polyurethane, rayon, acetate, cotton, silk, wool, flax, hemp, carbon and glass.

* * * * *